United States Patent [19]

Hewett

[11] 4,287,912
[45] Sep. 8, 1981

[54] MONOFLOW BALL VALVE AND SYSTEM

[75] Inventor: Charley L. Hewett, Englewood, Colo.

[73] Assignee: Kem-O-Kleen, Inc., Englewood, Colo.

[21] Appl. No.: 133,637

[22] Filed: Mar. 24, 1980

[51] Int. Cl.³ .............................................. F16K 15/04
[52] U.S. Cl. .............................. 137/516.27; 137/523; 137/536; 137/539
[58] Field of Search ...................... 137/516.27, 516.29, 137/533.11, 533.13, 533.15, 523, 536, 539, 539.5, 843, DIG. 4; 251/DIG. 3

[56] References Cited

U.S. PATENT DOCUMENTS

| | | | |
|---|---|---|---|
| 1,279,599 | 9/1918 | Slaughter | 137/533.15 X |
| 1,999,693 | 4/1935 | Hill | 137/539 |
| 2,884,223 | 4/1959 | Cooksley | 137/533.11 |
| 3,077,204 | 2/1963 | Bennett | 137/843 |
| 3,324,673 | 6/1967 | Lindahl | 137/539 X |
| 3,447,564 | 6/1969 | North | 137/843 X |
| 3,766,940 | 10/1973 | Mason | 137/533.11 X |
| 3,799,132 | 3/1974 | MacGuire | 137/843 X |
| 3,884,447 | 5/1975 | Alexander | 251/DIG. 3 |

Primary Examiner—Robert G. Nilson
Attorney, Agent, or Firm—Ancel W. Lewis, Jr.

[57] ABSTRACT

A monoflow ball valve is disclosed that is particularly suited using plastic materials that resist metal-corrosive acids, as in a spray system using hydrofluoric acid and the like. The valve has a valve body with a passage section smaller than the external diameter of the ball and the ball is forced into the generally cylindrical passage section to become a highly effective fluid-tight seal. A spacer at the inlet forms with the ball a second fluid-tight seal and is adjustably movable to dislodge the ball from the passage section if required.

22 Claims, 7 Drawing Figures

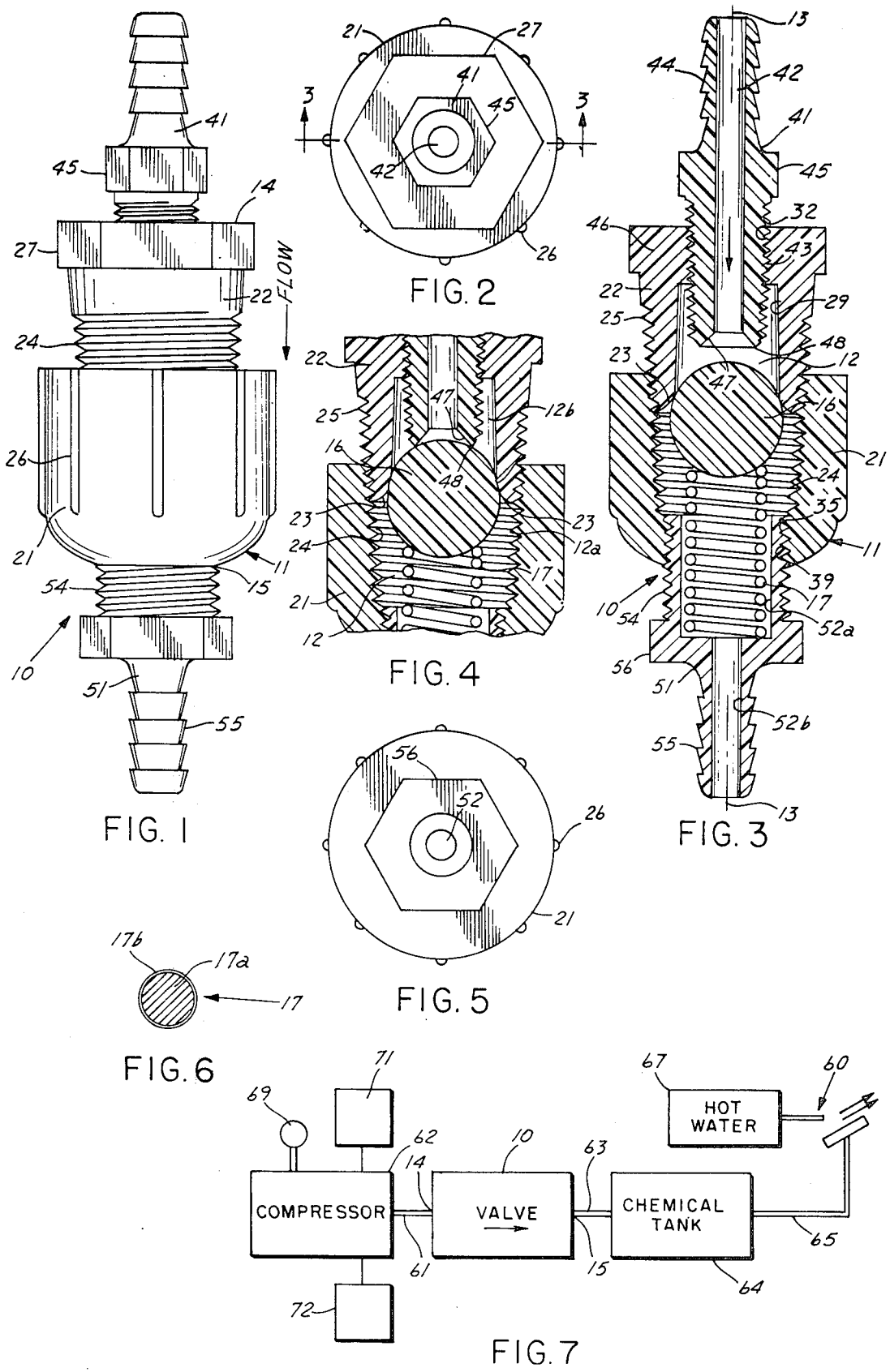

MONOFLOW BALL VALVE AND SYSTEM

TECHNICAL FIELD

This invention relates to a novel and improved monoflow valve that is particularly suited for use in pressurized lines in a fluid flow system carrying metal-corrosive fluids, including acids.

BACKGROUND ART

Monoflow valves are used to prevent backflow in pressurized flow systems and typically such valves utilize a ball and seat which acts to allow flow in one direction and resist flow in the opposite direction. This type of valve is frequently referred to as a mono-flow ball valve. The resistance to backflow is usually accomplished by maintaining the ball against an internal seat to close the flow passage. A sufficient pressure gradient in one direction against the ball will overcome the force maintaining the ball against the seat and allow flow.

There are valve-controlled pressurized fluid flow systems in which metal-corrosive acids such as hydrochloric acid, hydrofluoric acid, sulphuric acid and the like are being handled. An example of this type of system is disclosed in U.S. Pat. Nos. 3,997,114 and 4,046,321, assigned to the assignee of the present invention.

A problem that can occur with monoflow ball valves is that the ball may become lodged against the seat and prevent flow in either direction. The likelihood of this occurring is increased in a flow system in which acid or caustic fluids are being pumped.

DISCLOSURE OF INVENTION

In accordance with the present invention there is disclosed a monoflow ball valve including a valve body having an internal flow passage containing a compressible ball with a smaller generally cylindrical passage section sized in relation to the ball so that the ball may be forced into the passage section and compressed to form a first fluid-tight seal against backflow and further against a spacing surface within the passage section that limits the extent of insertion, provides a means for releasing the ball from a stuck position by axial movement thereof, and forms a second fluid-tight seal against backflow. The valve of the present invention also incorporates non-metallic acid-resistant materials, preferably plastic, which are not subject to the corrosive or caustic effects of common industrial acids. The valve includes a spacing member that also serves as an inlet coupling and forms a second fluid-tight seal with the ball to prevent backflow. This spacing member is threaded in the valve body to dislodge the ball in the event it becomes stuck in the passage section.

BRIEF DESCRIPTION OF DRAWING

The details of this invention will be described in connection with the accompanying drawing, in which:

FIG. 1 is a side elevation view of a monoflow ball valve embodying features of the present invention operated in the upright position shown with the direction of fluid flow indicated by an arrow;

FIG. 2 is a top plan view of the valve shown in FIG. 1;

FIG. 3 is a sectional view taken along lines 3—3 of FIG. 2 with the ball in an at-rest position;

FIG. 4 is a sectional view of the valve with the ball in a sealed position within the passage section;

FIG. 5 is a bottom plan view of the valve shown in FIG. 1;

FIG. 6 is an enlarged sectional view of one coil of the compression spring shown in FIG. 3; and FIG. 7 is a schematic diagram showing the valve in a pressurized fluid flow system conducting metal-corrosive cleaning chemicals to a spray head.

DETAILED DESCRIPTION

Referring now to FIGS. 1-5 of the drawings, the monoflow ball valve 10 shown is generally comprised of a valve body 11 having an internal flow-through passage 12 concentric with and extending along the longitudinal axis 13 of the body. The valve body 11 is arranged for the flow of fluids from an inlet end generally designated by numeral 14 to an outlet end generally designated by numeral 15. The valve body 11 contains a ball 16 which cooperates with the inside of the valve body to permit fluid flow through the inlet end as shown by the arrow and via the passage and block flow in the reverse direction, as described more fully hereinafter. The ball is urged toward the inlet end by a compression spring 17, also described more fully hereinafter.

The valve body 11 shown is generally comprised of body portions 21 and 22, herein referred to as first and second portions, respectively. Portion 21 has a passage section 12a and portion 22 has a passage section 12b. While it is understood that the valve body 11 may be constructed as a unitary piece, it is preferred that it be constructed as two separate portions with the portion 22 telescopically received in portion 21 with the inside end of portion 22 providing a shoulder 23. Shoulder 23 extends generally in a direction normal to or radially of the longitudinal axis 13 that limits the movement of the ball in the flow passage toward the inlet end until a sufficient pressure is applied to the outlet end to force the ball into the inside of the passage section 12b.

The shoulder 23 is internally chamfered to form a throat of larger diameter than the inside diameter of the rest of section 12b. The shoulder goes from a larger inside diameter to a smaller inside diameter toward the inlet along a convex curve or radius. This shape provides a lead-in guide and an initial seat for positioning the ball in the normal at-rest position shown in FIG. 3. The ball is shown in FIG. 4 as urged against the shoulder 23 by the resilient spring 17. The force exerted by the spring 17 is normally about what gravity would exert if the valve were inverted from the position shown.

The body portion 21 shown is in the form of a generally cylindrical female pipe fitting having its internal generally cylindrical passage section 12a tapering slightly radially inwardly toward the inlet end and is provided with internal threads 24 that mate with external threads 25 on body portion 21. Body portion 21 is in the form of a male pipe fitting so that portions 21 and 22 are threadedly joined together as shown. A separation of these two portions by threading enables the ball to be readily placed in and removed from the valve body passage. The taper causes the pipe section to become compressed as the body portions are threaded together. Body portion 21 is further provided with a plurality of circumferentially spaced, longitudinally extending gripping ribs 26 to assist in threading two portions for the assembly and disassembly thereof. Body portion 22 has hexagonally shaped external gripping surfaces 27 for this purpose.

An inlet coupling and spacer member 41 having a central passage 42 coaxially alined with passage 12 is shown mounted on the inlet end of the valve body. Member 41 has an externally threaded portion 43 that threads into internal threads 32 in an inlet end wall section 46 of the smaller body portion, a nipple portion 44 at the inlet end adapted to receive the end of a flexible pipe or the like, and a hexagonally shaped external gripping surface 45 between portions 43 and 44. The inner end of spacer 41 is internally chamfered at 47 and forms a sharp edge or rim 48 to limit the extent the ball goes into the smaller body portion and forms with the ball a second fluid-tight seal to prevent backflow.

An outlet coupling member 51 with a central passage 52 coaxially alined with passage 12 is shown mounted in the outlet end of the valve body and serves to couple outgoing fluid flow from the valve body. Coupling member 51 has an externally threaded portion 54 that threads into internal threads 35 in an outlet end section 39 of body portion 21. The coupling member 51 has a portion 52a of a larger diameter forming a socket that receives and holds the spring 17 and a section 52b of a smaller diameter. Coupling member 51 has an external hex-shaped grip portion 56 and a nipple portion 55.

The body portions 21 and 22 and inlet and outlet couplings are preferably made of a polyvinylchloride material that is resistant to metal-corrosive acids.

The spring 17, shown in more detail in FIG. 6, has a metal core 17a with a coating 17b of a material that resists metal-corrosive acids such as a vinyl coating that is applied by dipping the spring at a temperature of about 500° F. into the coating. The ball is preferably a VITON material (synthetic rubber).

Referring now to FIG. 7, the above described valve 10 is shown connected in a pressurized system between the outlet line 61 of a compressor 62 and an inlet line 63 to a chemical tank 64. An outlet line 65 of the chemical tank is connected to a spray nozzle 60 which is also supplied hot water from a supply indicated at 67, whereby a mixture of cleaning chemical, such as hydrofluoric acid, and hot water is sprayed onto a surface to be cleaned. A cleaning system of this type is described in more detail in the above mentioned U.S. patents.

The compressor 62 is equipped with a pressure gauge 69, an output control valve 71 that limits the output psi of the compressor to the inlet of the valve to a selected amount such as 40 psi, and an on-off or petcock valve 72 that functions to reduce the pressure in the inlet line to zero when opened.

In a full sequence of operation for the valve 10, the spring urges the ball against the outlet end of the inlet coupling and spacer member 41 in the normal or at-rest position, as shown in FIG. 3. As the compressor 62 pumps, air is admitted past the ball and into the chemical tank to pressurize the chemical tank until a preselected pressure is reached such as, for example, 40 psi. At this pressure the pop-off or control valve 71 operates and the compressor delivers no more air under pressure to the tank.

At this time there is pressure of 40 psi on both the inlet and the outlet sides of the ball and the ball is held against the shoulder by the spring, as shown in FIG. 2. The valve 72 may be opened to remove the 40 psi pressure on the inlet side of the ball so that the 40 psi pressure on the outlet side will force the ball into the passage section 12b in a fluid-tight sealed position, as shown in FIG. 4. In the sealed position the ball prevents any chemical fumes from flowing back into the compressor, which would corrode and eat away the compressor. The end of spacer member 41 contacts the ball to form a second fluid-tight seal to prevent backflow.

During the use of the spray nozzle the pressure in the chemical tank slowly drops below the required pressure and air is forced past the ball into the tank. The petcock valve 72 is momentarily opened to let the pressure on the inlet side of the valve force the ball into the passage section and then valve 72 is closed. When closed the pressure remains at zero on the inlet side of the ball and the ball remains in the sealed position due to the pressure in the chemical tank. If the compressor is running, then the air is forced past the ball in a pulsating action with the spring pressure and air pressure returning the ball to the contacting position on the shoulder at the end of each pulse. In the event the ball becomes stuck in the passage section, then the inlet coupling and spacing member 41 can be threaded in the valve body to move axially with respect thereto to dislodge the ball.

While the present invention has been described with a certain degree of particularity, it is understood that the present disclosure has been made by way of example and that changes in details of structure may be made without departing from the spirit thereof.

What is claimed is:

1. A monoflow ball valve for controlling fluid flow comprising:
   a valve body having an internal flow passage with an inlet and an outlet, said valve body having a first portion with a first passage section and a second portion with a second passage section, a shoulder at the inner end of said second portion and a spacing surface within said second portion;
   a resilient, compressible ball in said passage, said ball having an external dimension less than the internal dimension of said first passage section to slide therein and greater than the internal dimension of said second passage section, said ball being normally seated on said shoulder in a contacting position to block fluid flow toward said inlet, said ball being movable away from contact with said shoulder to permit fluid flow toward said outlet, said ball being movable into the inside of said second passage section in a compressed position to form a fluid-tight seal to prevent backflow from said outlet to said inlet, the extent to which said ball extends into said second passage section toward said inlet being limited by said spacing surface; and
   an inlet member adjustably movable axially relative to said second passage section having an inner end defining said spacing surface which, in use, is suitable for dislodging said ball from a lodged position in said second section upon the movement of said inlet member toward said outlet.

2. A monoflow ball valve as set forth in claim 1 wherein said second passage section is of a generally cylindrical shape to provide a continuous annular seal characterized by essentially a sphere compressed in a cylinder in said compressed position.

3. A monoflow ball valve as set forth in claim 1 wherein said second passage section is tapered slightly inwardly toward said inlet to compress the ball more tightly as the ball is forced further into said second passage section.

4. A monoflow ball valve as defined in claim 1 wherein said second portion is smaller in size than said first portion and telescopes within said first portion, said first portion having internal threads and said second portion having external threads threaded into said internal threads to removably join said first and second portions of said body.

5. A monoflow ball valve as set forth in claim 4 wherein said external threads and said internal threads are tapered slightly inwardly toward said outlet whereby said first portion and the associated first passage section are radially reduced in size as said second portion is threaded into said first portion.

6. A monoflow ball valve as defined in claim 1 wherein said shoulder is internally chamfered to form a throat of larger diameter than the internal diameter of said second passage section and converges from a larger inside diameter to a smaller inside diameter toward the inlet end along a convex curve to form a lead-in guide for guiding said ball into said second passage section.

7. A monoflow ball valve as set forth in claim 1 including resilient means in said passage for normally maintaining said ball against said shoulder and yieldable in response to a pressure on the inlet side of said ball to permit fluid flow in one direction and prevent fluid flow in the opposite direction.

8. A monoflow ball valve as defined in claim 7 wherein said resilient means includes a compression spring.

9. A monoflow ball valve as defined in claim 8 wherein said spring is in the form of a metal spring that is coated with a layer of non-metallic material that is resistant to metal-corrosive fluids.

10. A monoflow ball valve as defined in claim 8 including an outlet coupling member adjustably movable axially relative to said valve body and having a first internal passage section with an end wall providing a socket for receiving and holding said spring for adjusting the force with which the ball is maintained against said shoulder, thereby regulating the pressure required on the inlet side of the ball to move the ball away from the shoulder and allow fluid flow toward said outlet.

11. A monoflow ball valve as defined in claim 10 wherein said outlet coupling member has an externally threaded portion threaded into said valve body, a gripping surface portion, and a nipple portion adapted to readily insert into a fluid flow line.

12. A monoflow ball valve as defined in claim 1 wherein said ball is also in contact with said spacing surface when in said compressed position to form a second fluid-tight seal to prevent backflow through said passage.

13. A monoflow ball valve as defined in claim 1 wherein said inlet member has an externally threaded portion threaded into said valve body, a gripping surface portion, and a nipple portion adapted to insert into a fluid flow line.

14. A monoflow ball valve as defined in claim 1 wherein said inlet member has a narrower passage section and an internally chamfered section that widens from said narrower passage section toward an outlet end to apply pressure to a larger surface area of said ball to force said ball from the lodged position in response to a selected inlet pressure.

15. A monoflow ball valve as defined in claim 14 wherein said outlet end is generally V-shaped to define a relatively sharp rim edge that is contacted by said ball.

16. A monoflow ball valve as defined in claim 1 wherein said valve body and said ball are made of a non-metallic material that is resistant to metal-corrosive fluids.

17. A monoflow ball valve as defined in claim 16 wherein said valve body is made entirely from a plastic material.

18. A monoflow ball valve as defined in claim 17 wherein said material is polyvinylchloride.

19. A monoflow ball valve as set forth in claim 1 wherein said ball is of a synthetic rubber material.

20. A corrosion-resistant monoflow ball valve comprising:
a corrosion-resistant non-metallic valve body having an internal flow passage, said valve body having a first portion with a first passage section and a second portion with a second passage section, a shoulder at the inner end of said second body portion, and a spacing surface;
a corrosion-resistant, resilient, compressible ball movable in said passage, said ball being compressed into said second passage section when the pressure on the outlet side of the ball reaches a selected pressure in a sealed position to form a seal to prevent backflow through said passages;
a corrosion-resistant compression spring in said first passage section for resiliently urging said ball against said shoulder and yieldable in response to a selected pressure on the inlet side of said ball to allow a fluid to flow in one direction through said passage from the inlet to the outlet; and
an inlet member adjustably movable axially relative to said second passage section having an inner end defining said spacing surface which, in use, is suitable for dislodging said ball from a lodged position in said second section upon the movement of said inlet member toward said outlet.

21. A monoflow ball valve that is resistant to metal-corrosive acids comprising:
a plastic valve body that is resistant to metal-corrosive acids having an internal flow passage extending along the longitudinal axis thereof, said valve body having a first portion with a first passage section and a second portion with a second passage section, a shoulder at the inner end of said second body portion, and a spacing surface;
a non-metallic, resilient, compressible ball movable in said passage that is resistant to metal-corrosive acids, said ball being compressed into said second passage section when the pressure on the outlet side of the ball reaches a selected pressure in a sealed position to form a seal to prevent backflow through said passage;
a metal compression spring with a coating that is resistant to metal-corrosive fluids in said second passage section for resiliently urging said ball against said shoulder and yieldable in response to a selected pressure on the inlet side of said ball to allow a fluid to flow in one direction through said passage from the inlet to the outlet;
a plastic inlet coupling and spacer member that is resistant to metal-corrosive acids, said member being threaded in said valve body and having an outlet end providing said spacing surface, said outlet end of said spacer means forming with said ball a second fluid-tight seal to prevent flow through said passage; and
a plastic outlet coupling member that is resistant to metal-corrosive acids, said member being threaded in said valve body with an internal passage and an end wall for receiving and holding said spring.

22. In a pressurized fluid flow system having a compressor and a tank containing a metal-corrosive acid, a monoflow ball valve coupled between said compressor and tank for controlling fluid flow from the compressor to the tank and inhibiting backflow of acid fumes, said valve comprising:
- a corrosion-resistant plastic valve body having an internal flow passage with an inlet and an outlet, said valve body having a first portion with a first passage section and a second portion with a second passage section, a shoulder at the inner end of said second portion, and a spacing surface within said second portion;
- a corrosion-resistant, resilient, compressible ball in said passage, said ball having an external dimension less than the internal dimension of said first passage section to slide therein and greater than the internal dimension of said second passage section, said ball being normally seated on said shoulder in a contacting position to block fluid flow toward said inlet, said ball being movable away from contact with said shoulder to permit fluid flow toward said outlet, said ball being movable into the inside of said second passage section in a compressed position to form a fluid-tight seal to prevent backflow from said outlet to said inlet, the extent to which said ball extends into said second passage section toward said inlet being limited by said spacing surface; and
- an inlet member adjustable movable axially relative to said second passage section having an inner end defining said spacing surface which, in use, is suitable for dislodging said ball from a lodged position in said second section upon the movement of said inlet member toward said outlet.

* * * * *